(12) United States Patent
Haimer et al.

(10) Patent No.: US 6,900,418 B2
(45) Date of Patent: May 31, 2005

(54) INDUCTION COIL FOR AN INDUCTIVE SHRINKING APPARATUS

(75) Inventors: Josef Haimer, Igenhausen (DE); Franz Haimer, Igenhausen (DE)

(73) Assignee: Franz Haimer Maschinenbau Kg, Hollenback-Igenhausen (DE)

( * ) Notice: Subject to any disclaimer, the term of this patent is extended or adjusted under 35 U.S.C. 154(b) by 57 days.

(21) Appl. No.: 10/301,850

(22) Filed: Nov. 22, 2002

(65) Prior Publication Data

US 2003/0209535 A1 Nov. 13, 2003

(30) Foreign Application Priority Data

Nov. 23, 2001 (DE) .......................................... 101 57 432

(51) Int. Cl.[7] .................................................. H05B 6/14
(52) U.S. Cl. ...................... 219/607; 219/674; 219/635
(58) Field of Search ................................. 219/600, 607, 219/635, 672, 674

(56) References Cited

U.S. PATENT DOCUMENTS

| 3,697,715 A | * | 10/1972 | Morris et al. ............... 219/635 |
| 2001/0024020 A1 | * | 9/2001 | Rabe .......................... 279/158 |

FOREIGN PATENT DOCUMENTS

| CH | 254 868 A | 5/1948 |
| DE | H 18556Ib/7b | 9/1956 |
| DE | 200 08 937 U | 8/2000 |
| DE | 199 15 412 A1 | 10/2000 |
| DE | 100 15 074 C1 | 9/2001 |
| WO | WO 00/59676 | 10/2000 |

OTHER PUBLICATIONS

Patent Abstracts of Japan, Publication No. 09223573A, dated Aug. 26, 1997.

* cited by examiner

Primary Examiner—Teresa J. Walberg
(74) Attorney, Agent, or Firm—Rothwell, Figg, Ernst & Manbeck

(57) ABSTRACT

The induction coil (13) of an arrangement which heats a tool-holder (1) inductively for the purpose of changing a tool shank (11) retained with a press-fit therein has a winding (19), in the case of which the number of coil turns per unit of length in the direction of the coil axis and/or the number of coil turns per unit of surface area is smaller in an intermediate region located, in the direction of the coil axis, between two main winding regions (21, 23) than in the two main winding regions (21, 23) and/or the internal winding diameter is smaller in the two main winding regions (21, 23) than in the intermediate region and/or, at least in an axial sub-region of the induction coil (13), increases from the two main winding regions (21, 23) in the direction of the intermediate region. Such a winding achieves uniform heating of the tool-holder (1) in the axial direction of the tool shank (11) and, accordingly, it is possible even for tool shanks (11) retained with very small tolerances in the press-fit of the tool-holder (1) to be released from the shrink-fit without jamming.

11 Claims, 2 Drawing Sheets

INDUCTION COIL FOR AN INDUCTIVE SHRINKING APPARATUS

Figure 1:
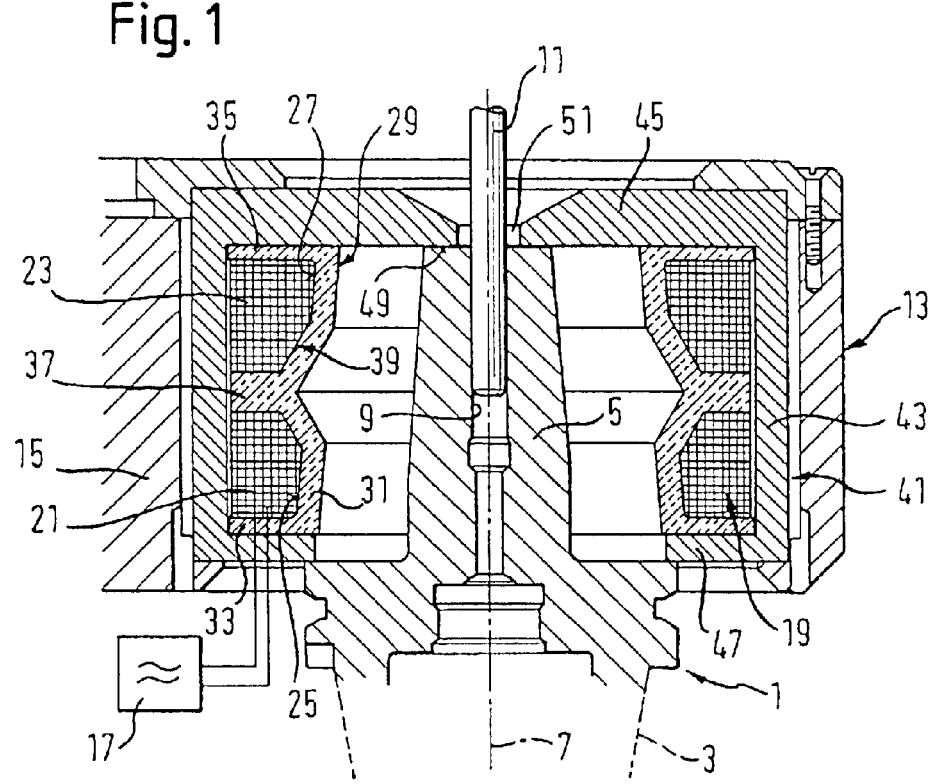

The invention relates to an arrangement for inductively heating a sleeve section which contains a central accommodating opening for a shank of a rotary tool, for example of a drill bit or milling cutter or of a reaming tool, and belongs to a tool-holder, which retains the tool shank, seated in the accommodating opening, with a press-fit and releases it when heated.

It is known, in particular in the case of tools rotating at high speed, for the shank thereof to be shrink-fitted into a sleeve section of a tool-holder. For this purpose, the sleeve section is heated, for example, by means of an induction coil enclosing it, with the result that the tool shank can be inserted into the thus expanding accommodating opening of the sleeve section. The external diameter of the tool shank is somewhat larger than the nominal diameter of the accommodating opening, with the result that, once the sleeve section has been cooled, the tool is retained with a press-fit in a rotationally fixed manner in the tool-holder.

In order to remove the tool, the sleeve section has to be reheated. Since there is a risk here of the tool shank heating as well, there may be problems if there is insufficient thermal expansion of the sleeve section in relation to the likewise expanding tool shank.

DE 199 15 412 A1 discloses an inductive heating arrangement for heating the sleeve section of a tool-holder. The arrangement has an induction coil which can be positioned on the sleeve section of the tool-holder, encloses the same annularly, at a radial distance therefrom, and is supplied with alternating electric current from a generator. The magnetic field of the induction coil induces, in the electrically conductive and mostly also magnetizable material of the tool-holder, induction currents which heat the sleeve section directly. The induction coil extends axially at least over the engagement length by which the tool shank penetrates into the accommodating opening and terminates axially with its winding approximately in the region of the tool end of the sleeve section. In the radial direction, the inner circumference of the induction coil runs at a distance from the sleeve section, in order for it to be possible to utilize one and the same induction coil for tool-holders with sleeve sections of different external diameters.

On its end sides and its outer circumference, the winding of the induction coil is encased by a casing made of magnetizable, i.e. ferromagnetic or ferrimagnetic, material, of which the magnetic conductivity, which is high in relation to air, concentrates the magnetic flux essentially on the casing. That region of the casing which is adjacent to the tool end of the sleeve section is designed as an essentially disc-like annular element which rests with its inner circumference on the tool end of the sleeve section and extends radially beyond the end surface of the winding of the induction coil as far as the outer circumference of the same. The annular element forms a pole shoe which is intended to concentrate the magnetic flux of the induction coil on the sleeve section. A further pole shoe is arranged on the axially opposite end surface of the induction coil and is connected in a magnetically conductive manner, via the magnetizable casing, to the pole shoe resting on the end surface of the sleeve section.

Shrinking tool-holders of the type explained above are intended to be capable of transmitting the largest possible torque to the tool retained with a press-fit.

Investigations with the aim of increasing the transmittable torque have shown that induction coils of the type known, for example, from DE 199 15 412 A1 heat the sleeve section of the tool-holder predominantly in a central region, that is to say the temperature of the sleeve section is at a maximum in this central region and decreases from there, in the axial direction of the sleeve section, towards both sides. This temperature distribution has consequences for releasing the tool from the shrink-fit in the tool-holder, because the shank of the tool seated in the sleeve section expands to a more pronounced extent in the central region of the sleeve section, with the result that, when drawn out, it jams at the end region of the sleeve section, which in some circumstances does not widen sufficiently. The tendency to jam has usually been avoided by increasing the pairing tolerances of the tool shank and accommodating opening of the sleeve section, although this has reduced the torque which can be transmitted from the tool-holder to the tool.

The object of the invention is to provide a shrinking arrangement with the aid of which even close-fitting tools can easily be released from the shrink-fit in tool-holders.

The invention is based on an arrangement for inductively heating a sleeve section which contains a central accommodating opening for a shank of a rotary tool and belongs to a tool-holder, which retains the tool shank, seated in the accommodating opening, with a press-fit and releases it when heated. Such an arrangement comprises an induction coil, which encloses the sleeve section of the tool-holder, and a generator, which supplies the induction coil with electric current of periodically changing amplitude.

The object specified above is achieved according to the invention in that—as seen in an axial-longitudinal-section plane of the induction coil—the number of coil turns of the winding of said induction coil per unit of length in the direction of the coil axis and/or the number of coil turns per unit of surface area of the axial-longitudinal-centre plane is smaller in an intermediate region located, in the direction of the coil axis, between two main winding regions than in the two main winding regions and/or the internal winding diameter is smaller in the two main winding regions than in the intermediate region and/or the internal winding diameter, at least in an axial sub-region of the induction coil, increases from the two main winding regions in the direction of the intermediate region.

Each of the abovementioned measures, on their own or also in combination with any others of the measures mentioned above, influences the distribution of the magnetic field or of the magnetic flux in the region of the sleeve section of the tool-holder and ensures a more uniform distribution of the induction currents in the axial direction of the sleeve section. In comparison with conventional induction coils, the sleeve section, and thus also the shank of the tool retained therein, is heated to a less pronounced extent in a central region than in the end regions of the sleeve section, which adjoin said central region axially on both sides. On account of the uniform heating of the sleeve section, it is even possible for tools with very narrow tolerances to be shrink-fitted and released from the shrink-fit.

In order for it to be possible to vary the number of coil turns per unit of length in the direction of the coil axis, it is possible to change the number of turns located radially one above the other along the coil axis. The number of coil turns per unit of surface of the axial-longitudinal-section plane can be changed by virtue of the axial and/or radial spacings between adjacent turns being changed. For this purpose, it is possible to position or wind in, for example, spacers, with the thickness changing in a predetermined manner, between layers of turns located radially one above the other or between axially adjacent turns.

A further measure according to the invention for reducing the induction currents in the central region of the sleeve section consists in changing the internal winding diameter. The internal winding diameter is larger in the intermediate region between the main winding regions than in the two main winding regions. In order for it to be possible for such an induction coil to be wound as easily as possible in a predetermined manner, a preferred configuration makes provision for the winding to be wound onto a coil-body sleeve of which the outer casing, which determines the internal winding diameter, forms an annular bead at least in the intermediate region, that is to say the turn diameter increases in the intermediate region. The annular bead may be limited to a sub-region of the overall length of the coil-body sleeve; it is also possible, however, for the coil-body sleeve to be of convex or barrel-like configuration over its entire length.

In a preferred configuration which is particularly easy to realize, the winding has no turns at least over an axial sub-section of the intermediate region. In this case, the induction coil comprises two axially spaced-apart sub-windings which form the two main winding regions. In such a case, that sub-section of the intermediate region which is free of turns may contain magnetically conductive material which concentrates the magnetic flux, in this sub-section, outside that region of the sleeve section of the tool-holder which is to be heated to a less pronounced extent, and accordingly reduces the induction currents in this region of the sleeve section. In order to facilitate the winding of the two-part induction coil, the winding may be wound onto a coil-body sleeve with an annular flange separating the main winding regions in the turn-free sub-section of the intermediate region.

Conventional induction coils, as are known for example from DE 199 15 412 A1, have a single winding which is wound with a constant number of layers over the axial coil length and of which the turns are all connected in series with one another. A further measure for influencing the axial distribution of the induction currents, and thus the heating temperature along the sleeve section of the tool-holder, consists in dividing up the winding into at least two main winding regions which are arranged axially one beside the other and each have a multiplicity of turns, and in connecting the main winding regions in parallel with one another, to be precise such that the turns of the main winding regions have current flowing through them in the same direction. In other words, for the purpose of heating the sleeve section, use is made of a plurality of sub-coils or sub-windings which are separate from one another, but arranged axially one beside the other, and can be adapted specifically to heating a sub-region of the sleeve section. This aspect of the invention explained above also has independent inventive importance. Provision is preferably made here for the currents in the main winding regions to be set independently of one another in order, in this way, for the induction currents induced in the sleeve section to be defined, with the effect of uniform heating.

In order to define the ratio of the currents in the main winding regions, it is possible, for example, for the wire diameter of the main winding regions to be selected to be different. It is also possible for each main winding region to be supplied separately with current, in particular current of a load-independent constant amplitude, via separate generators.

Flux-conducting elements made of electrically non-conductive, but magnetically conductive material are expediently arranged in the region of one or both axial ends of the winding and/or on the circumference thereof. Such magnetic flux-conducting elements reduce the magnetic dispersion outside the induction coil and concentrate the magnetic flux on the sleeve section of the tool-holder. If, as has been explained above, the winding is constructed from a plurality of main winding regions connected in parallel with one another, it is also possible for a separate flux-conducting element of this type to be provided for each main winding region.

Figure 2:
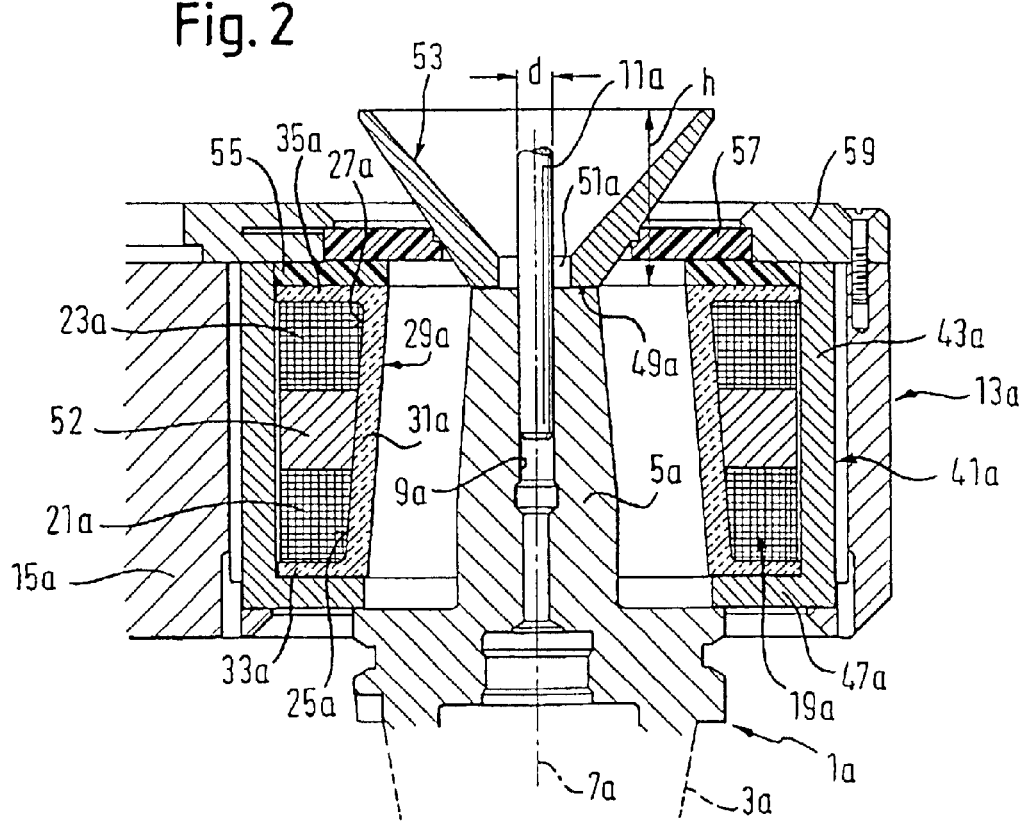
Figure 3:
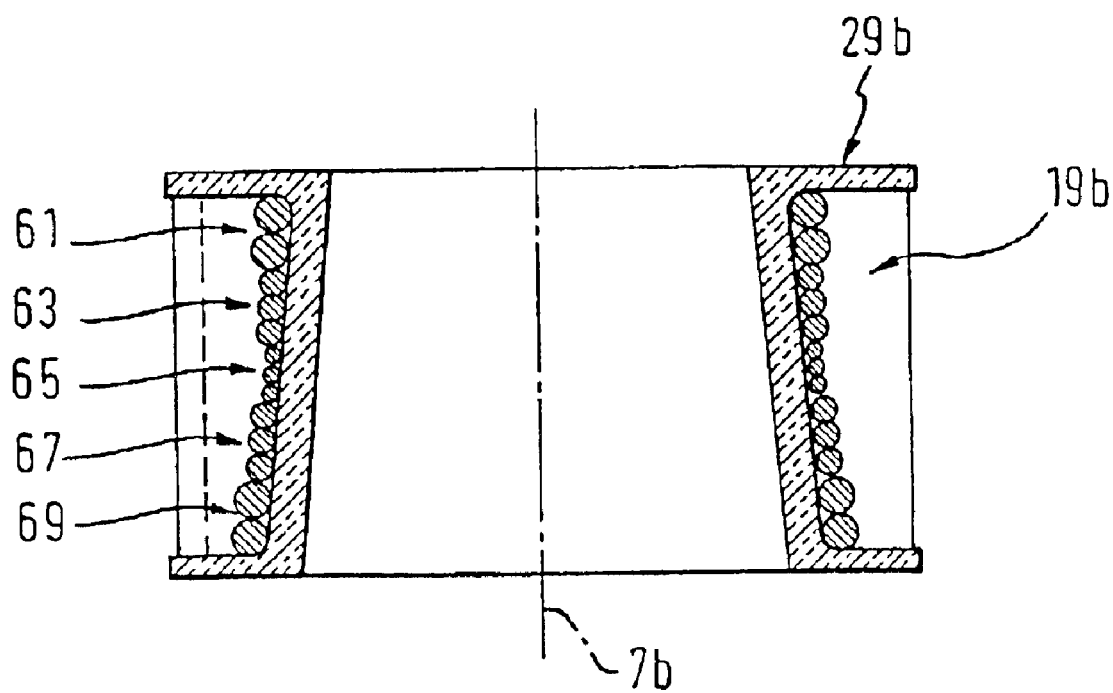

Exemplary embodiments of the invention are explained in more detail hereinbelow with reference to a drawing, in which:

FIG. 1 shows an axial longitudinal section through an induction coil for inductively heating a tool-holder, FIG. 2 shows an axial longitudinal section through a variant of the induction coil, and FIG. 3 shows a further variant of a winding of the induction coil.

FIG. 1 shows a tool-holder 1, which in this case comprises one part but may also possibly comprise more than one part, which is made of an at least electrically conductive, but in this case also magnetizable material, e.g. steel, and has a standard connector, e.g. a steep-taper cone element 3, at one axial end and a sleeve section 5 at its other axial end. The sleeve section 5 contains an accommodating opening 9 which is central in relation to the axis of rotation 7 of the tool-holder and is intended for a rotary tool, for example a drill bit, a milling cutter or a reaming tool, which can be inserted into the accommodating opening 9, by way of its shank 11, in a manner which will be explained in more detail hereinbelow but otherwise is not illustrated any more specifically. The external diameter of the shank 11 is somewhat larger than the free nominal diameter of the accommodating opening 9, with the result that the shank 11, inserted into the sleeve section 5, is retained with a press-fit for the purpose of transmitting the torque.

In order for it to be possible for the tool shank 11 to be inserted into the tool-holder 1 or removed therefrom, the sleeve extension 5 is widened by heating. The heating takes place by means of an induction coil 13 which is positioned on the sleeve extension 5, encloses the latter concentrically, with its internal diameter at a radial distance from the outer circumference of the sleeve section 5, is retained such that it can be displaced in an axis-parallel manner to the axis of rotation 7 by means of a holder of an induction-shrinking apparatus, said holder being indicated at 15, and is supplied, by a current generator 17, with alternating current or pulsed direct current of a frequency of, for example, 10–50 kHz. The magnetic flux, which is produced by a more or less cylindrical winding 19, which will be explained in more detail hereinbelow, induces, in the sleeve section 5, eddy currents which heat the sleeve section 5 in a relatively short period of time and thus widen the accommodating opening 9 sufficiently in order for the tool shank 1 to be pushed in or drawn out.

The winding 19 has two separate, axially spaced-apart main winding regions 21, 23, which are connected to the generator 17 in parallel with one another, to be precise with their winding direction being taken into account such that they have the current of the generator 17 flowing through them in the same direction, that is to say they produce magnetic fields which are in the same direction in relation to the sleeve extension 5. The two main winding regions 21, 23 are introduced into separate annular chambers 25, 27 of a sleeve-like coil body 29, which is made of a temperature-resistant plastic or of ceramic material and of which the basic sleeve 31 determines the internal diameter of the winding 19. The coil body 29 has, at its ends, radially outwardly projecting end plates 33, 35, which bound the annular chambers 25, 27 in the axially outward direction, and bears, between the main winding regions 21, 23, an annular flange 37 which subdivides the winding space into the two chambers 25, 27 and of which the axial thickness defines a turn-free or winding-free intermediate region between the two main winding regions 21, 23.

In the direction of the abovementioned winding-free intermediate region, the basic sleeve 31 of the coil body 29 is provided, over an axial sub-region of the axial length of the winding 19, with an annular bead 39, which in this case is in the form of a double cone and from the largest-diameter circumference of which the annular flange 37 extends. Otherwise, the basic sleeve 31 is of slightly conical configuration and tapers, in accordance with the outer casing surface of the sleeve extension 15, in the direction of the insertion side of the tool. The outer contour of the coil body 29, said contour being defined by the end plates 33, 35 and the annular flange 37, is circular-cylindrical and the winding 19 is introduced such that its outer contour is likewise circular-cylindrical. The inner contour of the winding 19, in the coil chambers 25, 27, follows the contour of the basic sleeve 31 or of the annular bead 39 thereof. Accordingly, as seen in the longitudinal-section plane from FIG. 1—for each of the two main winding regions 21, 23, the number of turns located radially one above the other changes per unit of length in the axial direction. In particular, the number of windings located radially one above the other in the two main winding regions 21, 23 is reduced by the annular bead 39 in the direction of the central region of the sleeve extension 5, which defines the maximum engagement length. Together with the winding-free region between the main winding regions 21, 23, this results in a reduction in the magnetic flux in the central region and thus in a reduction in the induction currents which heat the sleeve extension 5 in the central region. On account of the uniform heating which is thus produced in the axial direction of the sleeve extension 5, the tool shank 11 which is to be released from the shrink-fit is also heated uniformly and can be reliably released from the shrink-fit in the case of relatively low tolerances.

The annular bead 39 of the basic sleeve 31 increases the internal winding diameter of the main winding regions 21, 23 in the direction of the central region, which likewise ensures a more uniform temperature distribution along the sleeve extension 5. It goes without saying that the annular bead 39 may also extend over the entire axial length of the coil body 29. It is also possible for the annular bead, instead of the double-cone shape illustrated, to be of convex or barrel-like configuration.

In the exemplary embodiment of FIG. 1, the turns of the main winding regions 21, 23 are wound in the same way. In order to influence the temperature distribution in the axial direction of the sleeve section 5 which is to be heated, it is possible to vary the number of turns per unit of surface area of the longitudinal-section plane, to be precise such that the density of turns decreases in the direction of the central region. Defined spacings may be established by spacer sleeves which are also wound into the layers or by spacers between axially adjacent turns.

The main winding regions 21, 23 may be dimensioned for different magnetic fluxes and have different densities of turns, wire thicknesses or internal winding diameters. It is also possible for the main winding regions 21, 23 to be supplied individually with currents of different magnitudes. In so far as the above text has discussed the main winding regions 21, 23 being connected in parallel, this is also intended to be understood as being supplied with currents of different magnitudes, in particular load-independent currents of different magnitudes.

In order to keep the magnetic dispersion outside the sleeve extension 5 to as low a level as possible, the winding 19 is encased by a flux-conducting body 41 made of electrically non-conductive, ferromagnetic or ferrimagnetic material, for example ferrite or the like. The flux-conducting body 41 comprises a sleeve 43 which encases the winding 19 radially on the outside and is adjoined axially, on both sides of the winding 19, by pole shoes 45, 47 in the form of annular discs. The pole shoes 45, 47 cover over the axial end sides of the winding 19 and project in the direction of the sleeve extension 5. The pole shoe 45, which is provided on the tool-insertion side of the sleeve extension 5, overlaps the end side 49 of the sleeve extension 5 and is supported on the end side 49. A small annular gap 51, however, remains between the inner circumference thereof and the shank 11. The flux-conducting body 41 is illustrated as a single-part element. It goes without saying that it may also be constructed from more than one element.

Variants of the induction coil from FIG. 1 will be explained hereinbelow. For the purpose of explaining the construction, the functioning and possible variants, you are referred to the description relating to FIG. 1. Equivalent components are provided with the designations from FIG. 1 and, for differentiation purposes, are provided with a letter. The generator 17 from FIG. 1, although not illustrated, is present.

The induction coil 13a from FIG. 2 also comprises a winding 19a with two main winding regions 21a, 23a, which are separated from one another axially by a winding-free intermediate region. In contrast to FIG. 1, however, this winding-free intermediate region is filled not by a component of the coil body 29a which consists of electrically insulating material, but by a ring 52 made of ferromagnetic or ferrimagnetic, albeit in this case also electrically non-conductive material which concentrates the magnetic flux between the two main winding regions 21a, 23a on itself. The ring 52 may be a constituent part of the flux-conducting element 41a. On account of the turn-free region between the main winding regions 21a, 23a, the number of coil turns varies along the sleeve section 5 and, assisted by the ferromagnetic ring 52, ensures uniform heating of the sleeve section 5a when the tool shank 11a is released from the shrink-fit.

In the exemplary embodiment illustrated in FIG. 2, the basic sleeve 31a of the coil body 29a, once again, is of slightly conical configuration corresponding to the conical shape of the sleeve extension 5a. It goes without saying, however, that it is possible to use a circular-cylindrical basic sleeve here, as is also the case in FIG. 1. It is also possible for the basic sleeve 31a to be provided with an annular bead similar to the annular bead 39 from FIG. 1, in which case the ring 52 then replaces the annular flange 37. In other words, the annular flange 37 of the exemplary embodiment from FIG. 1 may possibly also consist of ferromagnetic material.

The induction coil 13a according to FIG. 2 further differs from the exemplary embodiment of FIG. 1 in respect of the design of its flux-conducting body 41a. It is also the case with this design that the winding 19a is enclosed radially on the outside by a sleeve 43a which is made of magnetically conductive material, e.g. ferrite, and on that end side of the winding 19a which is directed away axially from the insertion side of the tool, merges into a pole shoe 47a. On the end side which is axially adjacent to the tool-insertion side, the sleeve 43a terminates without merging into a pole shoe.

Instead, the end side 49a of the sleeve section 5a has positioned on it a screening collar 53 which in this case is more or less in the form of a conical bowl, consists of electrically non-conductive, but magnetically conductive material, e.g. ferrite, deflects the magnetic flux in optimal fashion from the sleeve 43a, which projects axially some way beyond the winding 19a, to the end side 49a of the sleeve section 5a and, at the same time, screens that part of the tool shank 11a which projects beyond the sleeve section 5a, and protects it against inductive heating. The screening collar 53 runs at a distance from the sleeve 43 on all sides. In the exemplary embodiment illustrated, the tool-side end surface of the winding 19a is covered by a spacer disc 55 consisting of non-magnetic material, e.g. temperature-resistant plastic. In a variant, this disc 55, which terminates with its inner circumference, in turn, at a distance from the screening collar 53, may likewise consist of the magnetic material of the flux-conducting body 41a, and thus be a constituent part of the flux-conducting body 41a.

At least in a sub-region, that surface of the screening collar 53 which is directed axially towards the interior of the induction coil 19a runs radially between the outer circumference of the tool end of the sleeve section 5a and the inner circumference of the induction coil 19a and axially obliquely outwards in the radial direction away from the end of the sleeve section 5a. The axial height h of the screening collar 53, by means of which the latter projects axially beyond the end surface 49a of the sleeve section 5a, is expediently equal to or greater than 1.5 times the diameter d of the shank 11 of the tool. It is also preferable for the largest diameter of the screening collar 53 to be smaller than the largest diameter of the winding 19a. It is possible for the screening collar 53 to run conically throughout or else to be provided with an axially projecting collar in the region of its outer circumference.

The screening collar 53, moreover, is connected to the induction coil 13a to form a unit and, for this purpose, may be connected, via an annular disc 57, to a housing 59 of the induction coil 13a, said housing being fastened on the holder 15a. For an exchangeable connection, the annular disc 57 and the housing 59 may be locked to one another, for example, in the manner of a bayonet closure. In this way, it is not just the case that the screening collar 53 ensures the axial positioning of the induction coil 13a relative to the sleeve section 5a; it can also be exchanged for the purpose of adapting one and the same induction coil 13a to tool-holders 1 with accommodating openings 9a or sleeve extensions 5a of different diameters. It goes without saying that the variant of the screening collar explained above can also be used for a design of the induction coil according to FIG. 1, instead of the pole shoe 45 which is explained there, and, similarly, the pole shoe 45 explained with reference to FIG. 1 can be utilized for an induction coil according to FIG. 2.

FIG. 3 shows, schematically, a further variant of a winding 19b which, once again, is positioned on a coil body 29b of the type explained above, in particular with reference to FIG. 2. The winding 19b has a plurality of, in this case five, main winding regions 61–69 which are wound independently of one another, are limited to an axial sub-region of the overall axial length of the coil body 29b and of which the wire diameter decreases in steps from the axial ends of the winding 19b in the direction of a central region. Accordingly, the main winding regions 61, 69 have the largest wire diameter, while the central main winding region 65 has the smallest wire diameter. The main winding regions 61–69 are all connected in parallel with one another, to be precise, once again, such that all the main winding regions induce induction currents in the same direction in the tool-holder sleeve extension, which is not illustrated specifically. On account of the graduated wire diameter, currents of different magnitudes flow in the main winding regions, said currents resulting in the induction currents being graduated and thus in the heating temperature of the sleeve extension being evened out. It goes without saying that the winding, which is merely schematically indicated in FIG. 3, fills the entire winding space of the coil body 29b. The winding 19b can be used together with flux-conducting-body designs both from FIG. 1 and from FIG. 2. The measures explained with reference to FIGS. 1 and 2 for influencing the axial distribution of the induction currents can also be used for the main winding regions 61–69 individually.

What is claimed is:

1. Arrangement for inductively heating a sleeve section (5) which contains a central accommodating opening (9) for a shank (11) of a rotary tool and belongs to a tool-holder (1), which retains the tool shank (11), seated in the accommodating opening (9), with a press-fit and releases it when heated, comprising:
   an induction coil (13), which encloses the sleeve section (5) of the tool-holder (1), the coil having a central longitudinal axis, and
   a generator (17), which supplies the induction coil (13) with electric current of periodically changing amplitude, characterized in that—as seen in an axial-longitudinal-section plane of the induction coil (13)—the number of coil turns of the winding (19) of said induction coil per unit of length in the direction of the coil axis (7) and/or the number of coil turns per unit of surface area of the axial-longitudinal-section plane is smaller in an intermediate region located, in the direction of the coil axis (7), between two main winding regions (21, 23; 61–69) than in the two main winding regions (21, 23; 61–69) and/or the internal winding diameter is smaller in the two main winding regions (21, 23; 61–69) than in the intermediate regions and/or the internal winding diameter, at least in an axial sub-region of the induction coil (13), increases from the two main winding regions (21, 23; 61–69) in the direction of the intermediate region.

2. Arrangement according to claim 1, characterized in that the winding (19) has no turns at least over an axial sub-section of the intermediate region.

3. Arrangement according to claim 2, characterized in that the sub-section of the intermediate region which is free of turns contains magnetically conductive material (52).

4. Arrangement according to claim 2, characterized in that the winding is wound onto a coil-body sleeve (31) with an annular flange (37) separating the main winding regions (21, 23) in the turn-free sub-section of the intermediate region.

5. Arrangement according to one of claim 1, characterized in that the winding is wound onto a coil-body sleeve (31) of which the outer casing, which determines the internal winding diameter, forms a radially outwardly projecting annular bead (39) at least in the intermediate region.

6. Arrangement according to claim 1, characterized in that the winding (19) comprises at least two main winding regions (21, 23; 61–69) which are arranged axially one beside the other and each have a multiplicity of turns, and in that the main winding regions (21, 23; 61–69) are connected in parallel with one another, to be precise such that the turns of the main winding regions have current flowing through them in the same direction.

7. Arrangement according to claim 6, characterized in that the main winding regions (21, 23; 61–69) have currents of different magnitudes flowing through them.

8. Arrangement according to claim 6, characterized in that the winding (19*b*) comprises a plurality of main winding regions (61–69) which are connected in parallel and of which the windings have different wire diameters, at least the main winding region (61) which is located nearest the tool-insertion side having a larger wire diameter than the axially adjacent main winding region (63 or 65).

9. Arrangement according to claim 8, characterized in that at least three parallel-connected main winding regions (61–69) are provided, of which the main winding region (63–67) provided in a central region has a smaller wire diameter than the main winding regions provided axially on both sides.

10. Arrangement according to one of claim 1, characterized in that a flux-conducting element (41) made of electrically non-conductive, but magnetically conductive material is arranged in the region of one or both axial ends of the winding (19) and/or on the circumference thereof.

11. Arrangement for inductively heating a sleeve section (5) which contains a central accommodating opening (9) for a shank (11) of a rotary tool and belongs to a tool-holder (1), which retains the tool shank (11), seated in the accommodating opening (9), with a press-fit and releases it when heated, comprising:

an induction coil (13), which encloses a sleeve section (5) of a tool-holder (1) for retaining a tool shank of a rotary tool, and a generator (17), which supplies the induction coil (13) with electric current of periodically changing amplitude, characterized in that—as seen in an axial-longitudinal-section plane of the induction coil (13)—the number of coil turns of the winding (19) of said induction coil per unit of length in the direction of the coil axis (7) and/or the number of coil turns per unit of surface area of the axial-longitudinal-section plane is smaller in an intermediate region located, in the direction of the coil axis (7), between two main winding regions (21, 23; 61–69) than in the two main winding regions (21, 23; 61–69) and/or the internal winding diameter is smaller in the two main winding regions (21, 23; 61–69) than in the intermediate regions and/or the internal winding diameter, at least in an axial sub-region of the induction coil (13), increases from the two main winding regions (21, 23; 61–69) in the direction of the intermediate region.

* * * * *